Figure 1:
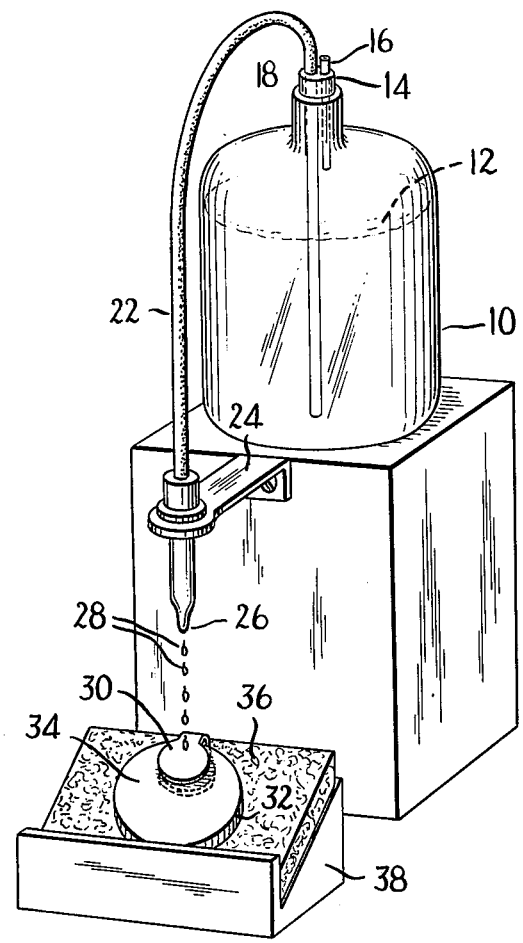

United States Patent [19]
Videen

[11] 3,881,278
[45] May 6, 1975

[54] METHOD OF MAKING MULCH COMPOSITION

[75] Inventor: Otis R. Videen, Roseville, Minn.

[73] Assignee: Conwed Corporation, St. Paul, Minn.

[22] Filed: June 17, 1974

[21] Appl. No.: 479,831

Related U.S. Application Data

[63] Continuation-in-part of Ser. No. 310,418, Nov. 29, 1972, abandoned.

[52] U.S. Cl. .......................................... 47/58; 47/9
[51] Int. Cl. ............................................... A01g 1/00
[58] Field of Search ....... 131/140 C, 140 R, 2; 47/9, 47/58

[56] References Cited
UNITED STATES PATENTS

| | | |
|---|---|---|
| 1,882,377 | 10/1932 | Whittelsey .............................. 47/9 |
| 2,842,897 | 7/1958 | Finn ........................................ 47/9 |
| 3,017,720 | 1/1962 | Busch .................................... 47/9 X |
| 3,404,690 | 10/1968 | Moshy et al. .................... 131/140 C |
| 3,696,559 | 10/1952 | Hatton ................................ 47/9 X |

Primary Examiner—Robert E. Bagwill
Attorney, Agent, or Firm—Eyre, Mann & Lucas

[57] ABSTRACT

A method of making a mulch composition for mass plantings is disclosed. The process comprises the addition and intimate admixing of a suitable tackifier material under turbulent conditions and elevated temperatures whereby the integrity of the mulch is retained during rainfall or relatively high winds due to attachment of the binder to the mulch material.

7 Claims, 2 Drawing Figures

PATENTED MAY 6 1975 3,881,278

METHOD OF MAKING MULCH COMPOSITION

The present invention is a continuation-in-part of application Ser. No. 310,418 filed Nov. 29, 1972 and now abandoned.

The present invention relates to a new and useful process for making a mass planting mulch composition. Mass planting mulch compositions are used for seeding large areas, such as planting grass along the side of highways. The mulch material is combined with water and the desired seed and then sprayed onto the area to be seeded. The mulch fiber serves a number of purposes including holding the seed in place, serving to enrich the soil thereby helping the seed to grow, preventing erosion, controlling weeds and, especially upon initial application, retaining the moisture with which the seeds are applied to help them in their original germination.

One of the principal problems that has been encountered with mass planting mulch materials is that the mulch material is frequently lost by wind or rain erosion. When the material is dry it tends to be dusty and get carried away by the wind. It will be appreciated that this can be quite hazardous when the area to which the mulch has been applied abuts a highway. When the mulch is applied especially on a hillside, it is frequently eroded and washed away by rain, especially if a heavy rain comes before the seeds have a chance to properly root in the soil.

Attempts have been made to overcome these problems by adding latex binders to the mass planting mulch material. While these latex binders will frequently do the job they have many disadvantages since they cannot be admixed with the mulch to form a dry product suitable for shipment to the area to be planted. They must either be admixed with water and the mulch prior to shipment or they must be admixed at the time of application. Admixing with water and the mulch at the manufacturing plant is undesirable since it increases storage, handling and transportation costs. Admixing at the time of application is undesirable since it increases handling costs, usually requires specialized equipment and is subject to error in dilution by the applier.

Attempts have also been made to overcome the problem by using dry, free-flowing binder materials which are combined with water and the mulch material at the application site. The disadvantage to this approach is that it is quite difficult to obtain intimate admixing of the binder and the mulch material, especially since most binders will tend to lump up when combined with water in a bath type mixing operation. It is also pointed out that the same problems will be encountered even if the mulch material and the binder are dry mixed at the manufacturing site since the binder will tend to separate due to settling out during handling, transportation, storage, etc.

In accordance with the present invention, it has been discovered that these disadvantages can be overcome by using a granular (powder, crystalline, etc.) binder material having certain specific properties and applying it to the mulch material by a specific process to form a dry free-flowing mass planting mulch material comprising defibrated vegetable material with binder attached thereto.

For the purposes of this specification and claims, binder materials included within the present invention will be referred to as "tackifier materials" and will be defined by specific tests hereinafter. Preferred tackifier materials include gelatin, carboxyalkyl celluloses and hydroxyalkyl guars. Best results have been obtained with hydroxyethyl guars and hydroxypropyl guars. Excellent results have also been obtained with a 1 percent solution of carboxymethyl cellulose having a viscosity of 1,000–2,800 centipoises at 25°C. Other suitable tackifier materials include methyl cellulose, cellulosic gums, protein, starch, polyacrylates, hydroxyethyl cellulose, polyvinyl alcohol and other materials which pass the test as tackifier materials as given hereinafter.

It is most important that the tackifier material be added to the wood fiber mulch under turbulent conditions at elevated temperatures as will be hereinafter more fully explained. The amount of tackifier material added is from about ½ to about 5 percent by weight of defibrated mulch material, preferably from about ¾ to about 3 percent and best results are obtained with an amount of about 1½ percent.

One of the essential features of the binders of the present invention is that upon application at the final site, accomplished by admixing the mulch material with attached binder in water, they have sufficient strength to hold the mulch material together to a degree sufficient to prevent it from materially eroding under wind and rain conditions which the mulch material can be expected to encounter. By experimentation to equate laboratory procedures with actual use conditions of the mulch materials of the present invention, it has been found that tackifier materials for use in the present invention will have sufficient strength if they pass the following test, identified as Test No. 1-357:

1. Blend 1 part of clay soil with 2 parts sand to form a soil admixture.

2. Form a 6 inch diameter soil cake by wetting 350 grams of soil admixture and then tamping it onto a filter paper in a 6 inch Buchner funnel. Press the soil cake flat with another filter paper over the top surface.

3. Add 3 grams of mulch fiber with tackifier material (prepared in the manner described hereinafter) to 75cc of water, admix thoroughly and pour the admixture onto a metal disc of 2 inch diameter on the surface of the soil cake. The metal disc is to prevent eroding of the soil. After all of the mulch admixture is applied to the surface of the soil cake, remove the metal disc and spread the mulch fiber evenly across the soil cake. Apply standard laboratory suction, as with a Venturi, to the Buchner funnel and continue until the excess water is removed from the soil.

4. Carefully remove the soil cake with mulch thereon from the Buchner funnel and place it on a piece of board to dry with the treated side up. The treated soil cake should be allowed to stand at least 24 hours before conducting the erosion test. At the time of the start of the erosion test, the soil cake should be quite dry and fairly hard.

5. Test the mulch material for capability of withstanding erosion in the following manner. Run water from a glass eye dropper tube connected to a gallon jug of water onto a metal plate on the top surface of the soil-mulch cake while the cake is held on a frame at a 45° angle. The piece of metal on top of the cake is a 1 inch diameter plate to prevent the water from immediately eroding the surface by constantly hitting the same spot on the cake. The test is continued until a portion of the mulch or soil has eroded away or until 3,500cc of water have been applied to the soil-mulch cake. A tackifier material is considered to pass the test and be suitable for the present invention if there is no visible washing away of the mulch or the soil after the application of 3,500cc of water.

Figure 2:
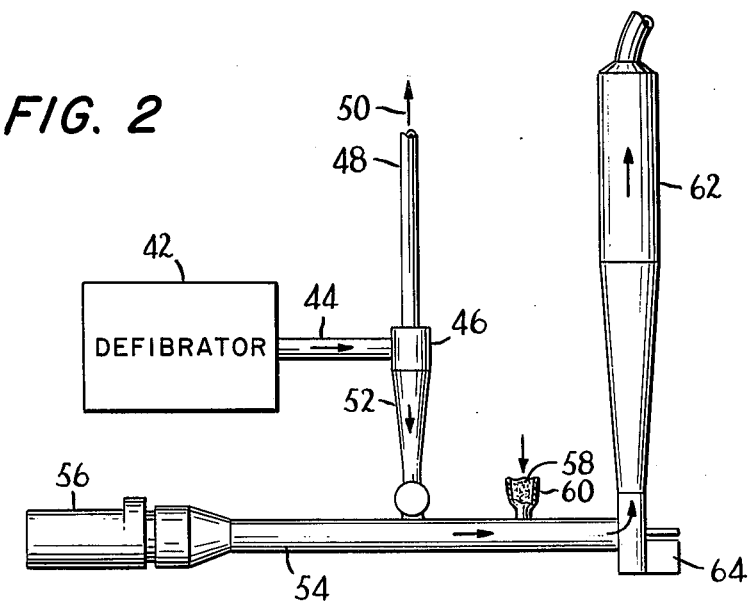

Referring to the drawings, FIG. 1 is an illustration of the erosion testing procedure, while FIG. 2 is an illustration of the defibration and tackifier addition steps.

The erosion test may be more fully understood with reference to FIG. 1 in which 10 is a jug with at least 3,500cc of water 12 therein, 14 is a cork in the bottle with vent tube 16 for entry of air and water tube 18 for exit of water connected to standard glass eye dropper 20 by means of a rubber hose 22 supported by bracket 24. The water exits in drops 28 from point 26 and drops onto metal disc 30 on soil cake 32 with mulch 34 thereon. The rate of water flow should empty 3,500cc from the jug in approximately 23 minutes. As is known, the rate of water flow can be adjusted by adjusting the height of the jug. The soil cake is supported by a piece of foam 36 in a holder 38 which maintains the cake at an angle of 45° from the horizontal. The distance between the tip of the eye dropper 26 and the metal disc 30 is 6 inches.

It has been found that any binder material which will pass the foregoing test will have sufficient binding properties to be a good tackifier material in mass planting mulch materials made by the process of the instant invention. For example, in a control test in which no tackifier material was added to the mulch, the mulch and soil cake were completely washed away by the stream of water of Test I-357 after only 500cc. In actual field tests similar results were obtained in that the mulch material was eroded before it had served its purpose as a mulch material. A test with a tackifier material known as Jaguar J 2S-1 which is a guar derivative available from Stein-Hall & Co., Inc. when added at 1½ percent in accordance with the present invention had no visible signs of erosion in either soil or mulch at the end of the 3,500cc test of Test I-357. This was also borne out in actual field testing where the same material made as a dry free-flowing material in accordance with the process of the instant invention and subsequently combined with water at the application site withstood erosion to the degree necessary to perform as a good mulch material.

In addition to passing the above Test No. I-357, the tackifier material must also pass a test identified as FF-1. Test FF-1 determines the free-flowing characteristics of the tackifier material and is conducted as follows:

1. The tackifier material is admixed with water in sufficient amount to dissolve it or make a liquid emulsion or slurry depending upon the particular material to be tested. The amount of water to be added is not critical so long as a solution, emulsion or slurry of liquid consistency is obtained.

2. The solution, slurry or emulsion is dried by driving off the water. The water may be suitably driven off by heating the solution, slurry or emulsion at a temperature below the decomposition temperature of the material being tested until as much water as possible evaporates.

3. If possible, the dried material is pulverized. If the material cannot be pulverized it does not pass this test. Materials which can be pulverized pass the test if they are relatively free-flowing, i.e., if they are not caked in a lump.

It has been found that any material capable of passing the above No. I-357 and No. FF-1 tests and which is not toxic to the seeds to be planted is suitable as a tackifier material for mass planting mulch materials and for use in the process of the instant invention.

According to the instant invention, the tackifier materials are added to the mulch material under turbulent conditions and at elevated temperatures, preferably during the defibrating process. The mulch materials of the present invention are defibrated vegetable matter, usually a wood fiber. It is preferable that a hard wood be used and best results are achieved with aspen. In addition to the defibrated vegetable material and the tackifier material of the present invention, the finished mulch material can also include materials such as fertilizers and other plant nutrients, dyes and the like.

Referring to FIG. 2 of the drawings there is seen an apparatus suitable for carrying out the process of the present invention. The vegetable material is first defibrated in steam (temperature preferably from about 212° to about 375°F.) in defibrator 42 in known manner and then passes along fiber blow line 44 to cyclone 46 wherein steam passes up flue 48 and out in the direction of arrow 50 and the defibrated material passes down through hopper 52 into chamber 54. The defibrated material entering chamber 54 can have a moisture content of from about 25 to about 100 percent by weight of the defibrated material with 50 percent being preferred. This defibrated material-water mixture is heated to a temperature of between 212° and 375°F., preferably 250° – 320°F., by air heater 56. The tackifier material 58 which has passed Tests I-357 and FF-1 is added in an amount of from about ½ to about 5 percent by weight of defibrated material through hopper 60. It is most important that there be sufficient turbulence in the chamber 54 to cause intimate admixture of the vegetable material and the tackifier material. Since the granular tackifier material will at least partially dissolve and become tacky in the presence of the water, the intimate admixing will result in the tackifier material being attached to the defibrated vegetable material. This is highly desirable so that there is no separation of tackifier material from the defibrated vegetable material by settling or the like during subsequent handling, storage, transportation, etc.

The vegetable fiber, water, and tackifier material then pass into a vertical drying tower 62, suitably a cyclone dryer, by means of fan dryer 64. It is important that there be sufficient turbulence in the drying tower to keep the particles of defibrated vegetable matter with attached tackifier material substantially discrete at least until they are dry to the point that they are no longer cohesive. If this is not done, the pieces will cohere and coagulate thus forming an undesirable and difficult to handle product. After the material leaves the drying tower it can be passed into a second drying tower, cooled or other known process steps including dyeing or the addition of nutrients or seeds can be carried out. The finished, dried mulch material will then be packaged, preferably in substantially moistureproof containers, for storage and later shipment. It will generally have a water content of about 10 percent or less.

The tackifier materials useful in the present invention are further illustrated by the following Examples in which the materials were tested according to Test I-357 as given hereinbefore.

EXAMPLE 1

In this example an admixture of carboxymethyl cellulose, 50% CMC 7H and 50% CMC 7L (both available from Hercules) was used at a use rate of 5 percent. The test material withstood the entire 3,500cc test.

EXAMPLE 2

In this example CMC 7H was used alone at a rate of 5 percent and again it withstood the 3,500cc test.

EXAMPLE 3

Kelgin LV (available from Kelco Co.) which is a sodium algin acid derivative was used at a rate of 3 percent. After 1,800cc, there was noticeable erosion of both the mulch and the soil thus demonstrating that this material at this rate is not suitable as a tackifier material for the present invention.

EXAMPLE 4

In this example Guar HEG (available from Stein-Hall & Co., Inc.) which is a hydroxyethylene derivative of guar was used at a rate of ½percent. After the 3,500cc test there was no noticeable erosion of either the mulch or the soil.

It will be understood that the claims are intended to cover all changes and modifications of the preferred embodiments of the invention, herein chosen for the purpose of illustration, which do not constitute departures from the spirit and scope of the invention.

What is claimed is:

1. The process of preparing a dry, relatively free-flowing mass planting mulch material comprising:
   a. defibrating vegetable material in the presence of steam;
   b. adding a granular tackifier material to said defibrated material while it is still moist with from about 25 to about 100 percent water by weight of defibrated material and while it is under sufficient turbulence to create intimate admixture of the defibrated vegetable material and the tackifier material and at a temperature of from about 212° to about 375°F. to cause the granules of tackifier material to become attached to the defibrated vegetable material, said tackifier material being present in an amount of from about ½ to about 5 percent of said defibrated vegetable matter and said tackifier material being one which will pass Test FF-1 and Test I-357;
   c. drying the admixture comprising defibrated vegetable material and tackifier under sufficient turbulence to keep the particles of defibrated vegetable material with attached tackifier material substantially discrete; and
   d. packaging the dried admixture comprising defibrated vegetable material with tackifier material attached thereto.

2. The process of claim 1 wherein the vegetable material is wood.

3. The process of claim 2 wherein the wood is aspen.

4. The process of claim 1 wherein the tackifier material is selected from the group consisting of hydroxyalkyl guar and hydroxypropyl guar.

5. The process of claim 1 wherein the dried admixture is packaged in a substantially moisture-proof container.

6. The process of claim 1 wherein the tackifier material is present in an amount of from about ¾ to about 3 percent by weight of defibrated vegetable material.

7. The process of claim 1 wherein the temperature of step (b) is from about 250° to about 320°F.

* * * * *